United States Patent
Kuiper et al.

(10) Patent No.: US 7,557,999 B2
(45) Date of Patent: Jul. 7, 2009

(54) VARIABLE FOCUS LENS HAVING TWO LIQUIDS AND ELECTRONIC DEVICE

(75) Inventors: Stein Kuiper, Vught (NL); Bernardus H. W. Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 28 days.

(21) Appl. No.: 10/599,866

(22) PCT Filed: Apr. 14, 2005

(86) PCT No.: PCT/IB2005/051229

§ 371 (c)(1),
(2), (4) Date: Oct. 12, 2006

(87) PCT Pub. No.: WO2005/101064

PCT Pub. Date: Oct. 27, 2005

(65) Prior Publication Data

US 2007/0206291 A1     Sep. 6, 2007

(30) Foreign Application Priority Data

Apr. 16, 2004 (GB) .................... 0408480.2

(51) Int. Cl.
*G02B 3/12* (2006.01)
(52) U.S. Cl. .............. 359/665; 359/666; 359/667
(58) Field of Classification Search .............. 359/228, 359/250, 253, 254, 358, 509, 665–667, 832; 396/529; 349/193, 200
See application file for complete search history.

(56) References Cited

U.S. PATENT DOCUMENTS

| | | | |
|---|---|---|---|
| 4,189,517 A | 2/1980 | Shanoski et al. | |
| 4,222,929 A | 9/1980 | Shanoski et al. | |
| 4,331,735 A | 5/1982 | Shanoski | |

(Continued)

FOREIGN PATENT DOCUMENTS

JP     2001013306 A     1/2001

(Continued)

OTHER PUBLICATIONS

Written Opinion of the International Searching Authority PCT/IB2005/051229.

(Continued)

*Primary Examiner*—Joseph Martinez

(57) ABSTRACT

A variable focus lens comprises a container enclosing an insulating liquid (A) and a conducting liquid (B), the insulating liquid (A) and the conducting liquid (B) being immiscible, having different refractive indices and being in contact with each other via an interface (14), the liquids (A, B) being at least partially placed in a light path through the container. The variable focus lens further comprises an electrode arrangement (2, 12) for controlling the shape of the interface (14) by means of an applied voltage. The container further comprises a transparent end portion (4) in the light path, a part (4') the transparent end portion (4) defining the shape of a part of the interface (14) at a predefined value of the voltage. Consequently, a variable focus lens with a reduced building height (H) is achieved that suffers less from the gradual formation of is small droplets of the conducting liquid (B) on the inner surface of the end portion (4).

10 Claims, 2 Drawing Sheets

(a)          (b)

U.S. PATENT DOCUMENTS

Figure 1:
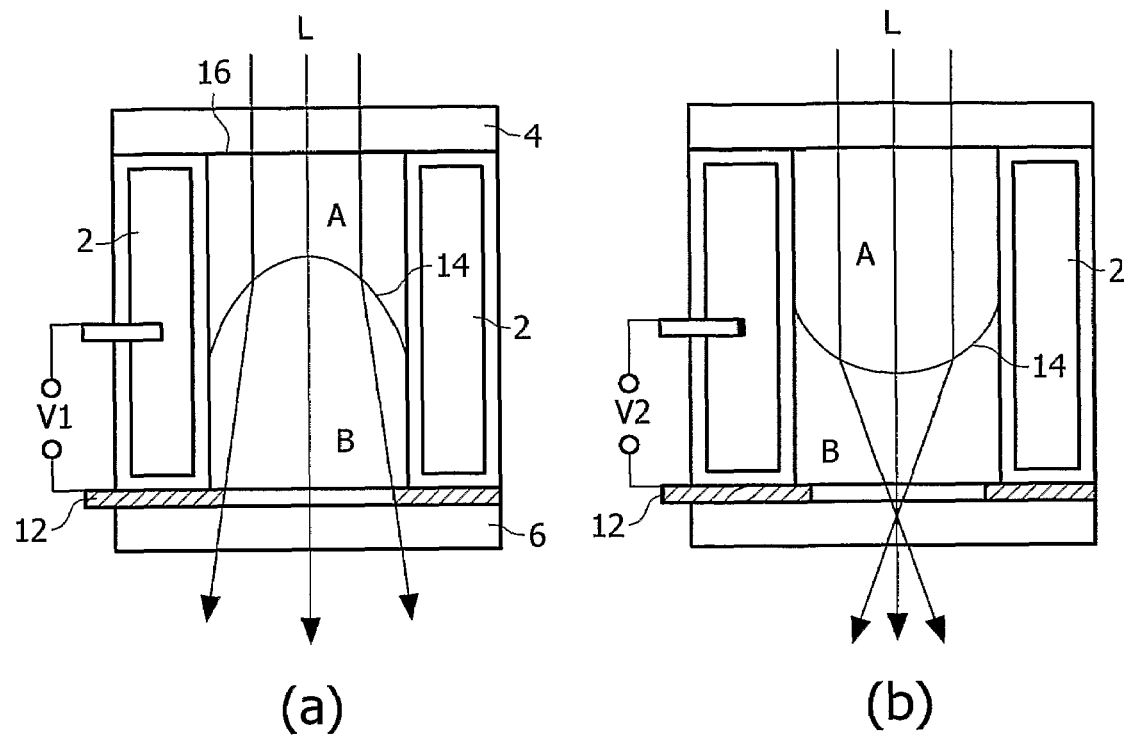

| | | | |
|---|---|---|---|
| 4,414,173 A | 11/1983 | Cobbledick et al. | |
| 4,515,710 A | 5/1985 | Cobbledick | |
| 5,084,353 A | 1/1992 | Cobbledick et al. | |
| 6,369,954 B1 * | 4/2002 | Berge et al. | 359/666 |
| 6,702,483 B2 * | 3/2004 | Tsuboi et al. | 396/449 |
| 6,934,090 B2 * | 8/2005 | Nagaoka et al. | 359/665 |
| 2001/0017985 A1 | 8/2001 | Tsuboi et al. | |

FOREIGN PATENT DOCUMENTS

| | | |
|---|---|---|
| JP | 2002169005 A | 6/2002 |
| WO | 03069380 A1 | 8/2003 |

OTHER PUBLICATIONS

ISR, International Search Report PCT/IB2005/051229.

* cited by examiner

VARIABLE FOCUS LENS HAVING TWO LIQUIDS AND ELECTRONIC DEVICE

The present invention relates to a variable focus lens comprising a container enclosing an insulating liquid and a conducting liquid, the insulating liquid and the conducting liquid being immiscible, having different refractive indices and being in contact with each other via an interface, the liquids being placed in a light path through the container; an electrode arrangement for controlling the shape of the interface by means of a voltage; the container further comprising a transparent end portion in the light path.

The present invention further relates to an electronic device comprising such a variable focus lens.

Optical devices based on the manipulation of liquids are rapidly gaining large commercial interest, not in the least because of their lack of mechanically moving parts and the relative simplicity of the devices, which makes the devices cheap and durable.

For instance, in U.S. patent application US2001/0017985 an optical device is disclosed that incorporates two immiscible liquids with equal refractive indices but different transmittances, with one of the two liquids being conductive. By varying the interface between these two liquids, the amount of each of the liquids in the light path through the device is changed and a diaphragm is obtained as a result.

International patent application WO03/069380 discloses a cylindrical variable focus lens incorporating two immiscible fluids having different refractive indices, one of the fluids being conductive and the other being insulating. The shape of the interface between the two fluids is manipulated by applying a voltage across the lens, which can be used to introduce a change in the focal point of the lens. The walls of the cylinder and one of the transparent lids of the cylinder are coated with a hydrophobic coating to ensure that at least in a switched off state the conductive fluid, which typically is a polar liquid, does not contact said walls in order to maintain a well-defined interface between the fluids.

However, since the lids of the cylinder may be formed from a hydrophilic material such as glass or a hydrophilic polymer, a pinhole in the hydrophobic coating can cause the formation of microdroplets of the conductive liquid at the pinholes over time due to slow penetration of the insulating liquid by the conductive liquid or by the presence of a temperature gradient through the variable focus lens, leading to the condensation of droplets of the conductive liquid on the inner surface of the colder of the two lids. This is highly unwanted, because these microdroplets distort the image that is generated by the lens.

The present invention seeks to provide an variable focus lens in which the formation of such microdroplets is significantly reduced.

The present invention further seeks to provide an electronic device comprising such an variable focus lens.

According to an aspect of the invention, there is provided an variable focus lens comprising a container enclosing an insulating liquid and a conducting liquid, the insulating liquid and the conducting liquid being immiscible, having different refractive indices and being in contact with each other via an interface, the liquids being at least partially placed in a light path through the container; an electrode arrangement for controlling the shape of the interface by means of a voltage; the container further comprising a transparent end portion in the light path, the transparent end portion defining the shape of a part of the interface at a predefined value of the voltage.

In such an variable focus lens, the conductive liquid intentionally touches the end portion of the container, e.g., a coated lid of a cylindrical chamber, at a predefined voltage. Consequently, the microdroplets of the conducting liquid that are present on the end portion will merge with the bulk conducting liquid due to the higher affinity therewith, thus yielding an end portion with a reduced number of microdroplets on its inner surface.

The variable focus lens of the present invention has the additional advantage that because of the fact that some optical power, e.g., lens power, is sacrificed to counter the presence of the microdroplets of the conducting fluid on the inner surface of the end portion, the building height of the variable focus lens can be reduced, which is an important advantage in application domains where the form factor of the device is of relevance, e.g., integration into camera modules for handheld devices such as mobile phones.

Preferably, the predefined voltage is 0 Volt, to have the conducting liquid touching the end portion in an off state of the variable focus lens. Obviously, when the interface is in contact with the transparent end portion, the image passing through the variable focus lens will be distorted. Therefore, it is desirable to let this occur during an off state of the variable focus lens, to prevent the user of the variable focus lens from noticing this distortion.

At this point, it is pointed out that in FIG. 7B of U.S. patent application US2001/0017985 discloses a diaphragm based on two immiscible liquids, in which the shape of the interface between the two liquids is partially defined by a lid of the container of the diaphragm. However, the two liquids disclosed therein have the same refractive indices but different transmittances. Consequently, the interface between the two liquids does not affect the direction of the light path through the diaphragm. In other words, its shape is irrelevant to the performance of the diaphragm, which is determined by the respective thicknesses of the liquid layers in the light path through the diaphragm. In contrast, the quality of the shape of the interface between the two liquids in a variable focus lens is crucial for the performance of a variable focus lens of the present invention. Therefore, it is not obvious to a person skilled in the art that a deformation of a liquid interface in a diaphragm as disclosed in U.S. patent application U.S.2001/0017985 would lead to an advantageous effect in a liquid-based variable focus lens.

In addition, U.S. patent application US2001/0017985 is completely silent about the problem of microdroplet formation on the end portion of the container touching the interface between the liquids, so a person skilled in the art would not derive the present invention from this prior art, rendering the present invention both novel and inventive over this prior art.

According to another aspect of the invention, there is provided an electronic device comprising an variable focus lens comprising a container enclosing an insulating liquid and a conducting liquid, the insulating liquid and the conducting liquid being immiscible, having different refractive indices and being in contact with each other via an interface, the liquids being placed in a light path through the container; an electrode arrangement for controlling the shape of the interface by means of a voltage; the container further comprising a transparent end portion in the light path, the transparent end portion defining the shape of a part of the interface at a predefined value of the voltage; and driver circuitry coupled to the electrode arrangement, the driver circuitry being arranged to provide the electrode arrangement with the predefined voltage in an idle state of the variable focus lens and provide the electrode arrangement with a further voltage for separating the interface from the transparent end portion when the variable focus lens is enabled.

This has the advantage that as soon as a functionality of the electronic device including the variable focus lens is started up, the driver circuitry will provide the electrode arrangement of the variable focus lens with the further voltage, leading to the separation of the interface from the transparent end portion, so that the user of the electronic device is provided with an undistorted image immediately after the start-up of the functionality requiring the variable focus lens.

In an embodiment, the further voltage is a further predefined voltage, which may be stored in an internal memory of the driver circuitry or in a memory external thereto, or may be hard-coded into the driver circuitry, and so on.

In an alternative embodiment, the electronic device further comprises an image sensor for sensing light passing through the variable focus lens, the image sensor being arranged to provide the driver circuitry with an output signal for controlling the magnitude of the further voltage.

In this embodiment, the further voltage is dynamically determined by means of an optical feedback mechanism. This has the advantage that a change in the variable focus lens characteristics, which for instance can happen through ageing of the variable focus lens and which will have an impact on the magnitude of the further voltage, is automatically compensated for.

Figure 2:
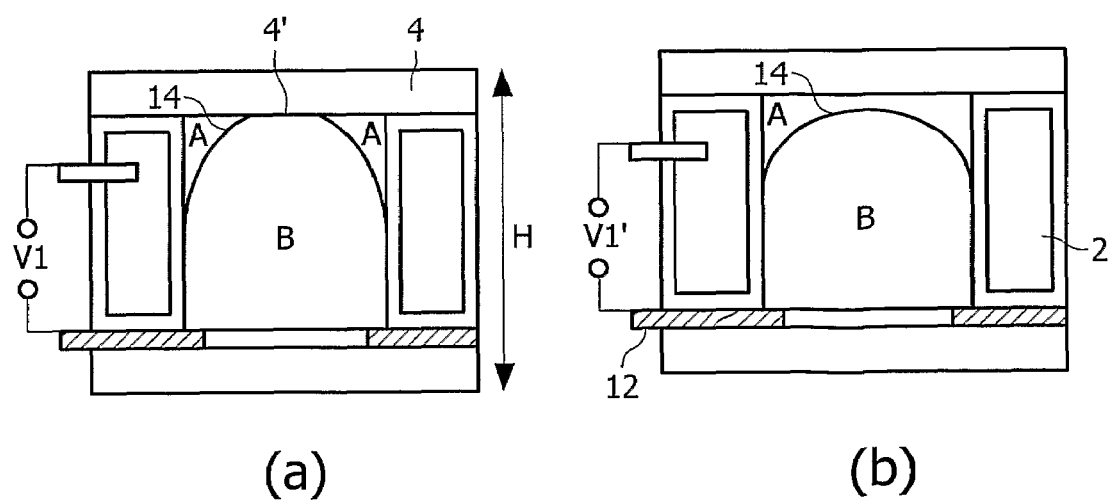
Figure 3:
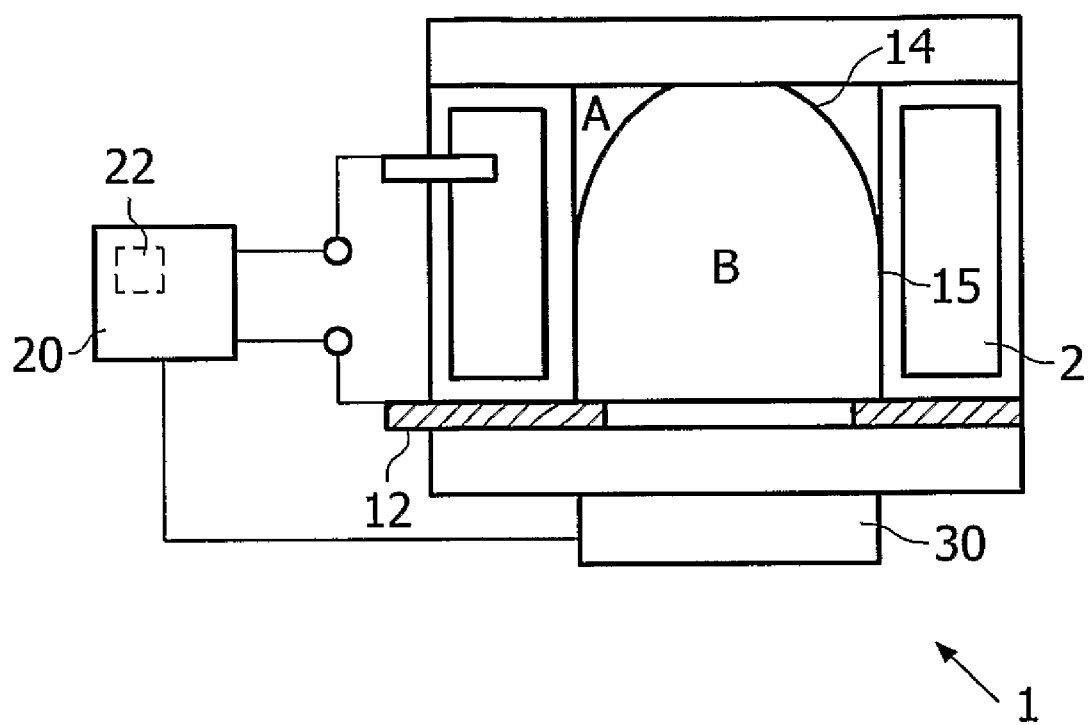

The invention is described in more detail and by way of non-limiting examples with reference to the accompanying drawings, wherein:

FIG. 1 schematically depicts a prior art variable focus lens;

FIG. 2 schematically depicts an variable focus lens according to the present invention; and FIG. 3 schematically depicts an electronic device according to the present invention.

It should be understood that the Figures are merely schematic and are not drawn to scale. It should also be understood that the same reference numerals are used throughout the Figures to indicate the same or similar parts.

In FIG. 1, a variable focus lens as disclosed in International Patent application WO 03/069380 is shown. The variable focus lens comprises a first insulating fluid A and a second conductive fluid B housed in a cylindrical chamber. In the context of the present invention, the phrase conductive is intended to include polar and polarizable fluids. The fluids A and B are immiscible, have different refractive indices and preferably have the same density to avoid orientation-dependent gravitational effects on the orientation of the fluids including the interface 14 between the fluids. The cylindrical chamber further comprises a first end portion 4 and a second end portion 6, with the first end portion 4 as well as the inner walls of the cylindrical chamber being covered by a hydrophobic and insulating coating such as AF1600™ from the DuPont company, which may be combined with a stack of parylene.

The shape of the interface 14 can be switched in a continuous fashion from a convex shape shown in orientation (a) to a concave shape shown in orientation (b) by varying a voltage from a value V1 to a value V2 across the cylindrical electrode 2 embedded in the chamber wall and a, preferably transparent, annular electrode 12 on the second end portion 6, which is in conductive contact with the second fluid B. Consequently, the focal point of the light path L through the cylinder is altered.

Inside this lens, microdroplets or small droplets of the second liquid B can become trapped on the inner surface of the end portion 4, causing aberrations in the image to be captured behind the variable focus lens. Such droplets can for instance be formed if the second end portion 6 is located in the presence of a heat source, e.g., an image sensor located behind the variable focus lens, causing condensation of the fluid B on the colder first end portion 4.

FIG. 2 shows an embodiment of a variable focus lens of the present invention. In comparison to the prior art lens shown in FIG. 1, the variable focus lens of the present invention has a reduced building height H causing a part of the interface 14 between an insulating liquid A and a conducting liquid B to be in contact with part 4' of the end portion 4. In other words, the part 4' of the end portion 4 defines the shape of the part of the interface 14 in contact with part 4'. The lower building height of the variable focus lens of the present invention is advantageous for integration of the variable focus lens in applications where building height is an issue, such as mobile phones equipped with variable focus lenses, compact cameras, portable multi-standard optical storage devices such as DVDs, or endoscopes.

In addition, small droplets of the conductive liquid B that have formed on part 4' of the end portion 4 or in the vicinity thereof during operation of the variable focus lens will be absorbed by the bulk of the conductive liquid B when the interface 14 is shaped as shown in (a). Preferably, position (a) is the position at rest, i.e., without the application of a voltage across electrode 2 and electrode 12, i.e., V1=0V, although this is not necessary.

When the interface 14 has a disrupted shape as shown in (a), the image captured behind the variable focus lens may be distorted, especially when the variable focus lens is used as a variable focus lens, in which case the insulating liquid A and the conductive liquid B have different refractive indices and preferably have similar densities. This can be avoided by applying a voltage V1' across the across electrode 2 and electrode 12 upon activation of the variable focus lens as shown in (b) to remove the contact between the interface 14 and the end portion 4.

It is emphasized that the end portion 4 may be any suitable lid for the container of the variable focus lens, e.g., a glass plate or a glass lens with a hydrophobic coating, a hydrophilic polymer plate or lens with a hydrophobic coating, a hydrophobic polymer plate or lens with a hydrophilic coating, an integral part of the container and so on. The container of the liquids preferably is cylindrical, although other shapes, e.g., conical shapes, are also feasible. It is also emphasized that the variable focus lens of the present invention preferably is a variable focus lens, but that this is not strictly necessary; a diaphragm such as disclosed in US patent application US2001/0017985 may also benefit from for instance the lower building height of the variable focus lens of the present invention.

FIG. 3 shows a part of an electronic device 1 of the present invention including the variable focus lens of the present invention as shown in FIG. 2 and described in the accompanying detailed description. The electronic device 1 further comprises driver circuitry 20 coupled to the electrode arrangement comprising electrode 2 and electrode 12. The driver circuitry may be responsive to an image sensor 30, which senses, or measures, the light i.e., the image, that passes through the variable focus lens. In an idle state of the variable focus lens, the driver circuitry 20 will apply a voltage V1 across the electrode 2 and the electrode 12, with V1 preferably being 0V. Upon activation of a function of the electronic device 1 requiring the functionality of the variable focus lens of the present invention, which for instance may be a user selecting a camera function on a mobile phone, the driver circuitry 20 will be triggered to apply a further voltage V1' across the electrodes 2 and 12 to remove the contact between the interface 14 and the end portion 4, as depicted in situation (b) in FIG. 2., after which the voltage may be varied between a value V1' and a value V2 as shown in FIG. 1(b) during operation of the variable focus lens of the present invention.

The magnitude of the further voltage V1' may be determined in a number of ways. For instance, the magnitude may be predefined and stored in a memory 22, which may be an internal memory structure of the driver circuitry 20 or an external memory, from where it is retrieved upon activation of the variable focus lens. This has the advantage that no measurements are required and that the interface 14 can be rapidly altered to the desired shape upon activation of the variable focus lens. However, in implementations of the variable focus lens of the present invention where the magnitude of the further voltage increases upon ageing of the variable focus lens, this may cause the magnitude of the further voltage stored in memory 22 to become insufficient.

Alternatively, the magnitude of the further voltage may be determined dynamically. This can for instance be achieved by increasing the voltage provided by the driver circuitry 20 to the electrode arrangement of the variable focus lens until the image captured by the image sensor 30 is free of the distortion caused by the contact of the interface 14 with the part 4' of the end portion 4 of the variable focus lens.

Other dynamical determinations of the magnitude of the further voltage can be thought of; for instance, the electrode arrangement of the variable focus lens may be extended with a transparent electrode (not shown) on the end portion 4 for sensing the presence of a conductive contact or a capacitance between the end portion 4 and the conducting liquid B, which can be used to accurately remove such a contact upon activation of the variable focus lens of the present invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A variable focus lens comprising:
   a container enclosing an insulating liquid and a conducting liquid, the insulating liquid and the conducting liquid being immiscible, having different refractive indices and being in contact with each other via an interface, the liquids being at least partially placed in a light path through the container;
   an electrode arrangement for controlling the shape of the interface by means of a voltage;
   the container further comprising a transparent end portion in the light path, a part of the transparent end portion of the container being in direct contact with and defining the shape of a central portion of the interface when the electrode arrangement is providing 0 volts.

2. The variable focus lens as claimed in claim 1, wherein the electrode arrangement is configured to apply a voltage sufficient to remove the central portion of the interface from the part of the transparent end portion of the container upon activation of any function that utilizes the variable focus lens.

3. The variable focus lens as claimed in claim 2, comprising an image sensor for sensing light passing through the variable focus lens, the image sensor being arranged to provide the electrode arrangement with an output signal for controlling the magnitude of the voltage sufficient to remove the central portion of the interface from the part of the transparent end portion of the container.

4. The variable focus lens as claimed in claim 2, wherein the electronic device further comprises an image sensor for sensing an image through the variable focus lens, the image sensor being arranged to provide the electrode arrangement with an output signal for controlling the magnitude of the voltage sufficient to remove the central portion of the interface from the part of the transparent end portion of the container.

5. The variable focus lens as claimed in claim 4, wherein the image sensor is arranged to increase the voltage sufficient to remove the central portion of the interface from the part of the transparent end portion of the container until the image is free of distortion.

6. An electronic device comprising:
   a variable focus lens comprising:
   a container enclosing an insulating liquid and a conducting liquid, the insulating liquid and the conducting liquid being immiscible, having different refractive indices and being in contact with each other via an interface, the liquids being at least partially placed in a light path through the container;
   an electrode arrangement for controlling the shape of the interface by means of a voltage;
   the container further comprising a transparent end portion in the light path, a part of the transparent end portion of the container being in direct contact with and defining the shape of a central portion of the interface when the electrode arrangement is providing 0 volts; and
   driver circuitry coupled to the electrode arrangement, the driver circuitry being arranged to:
   apply 0 volts across the electrode arrangement in an idle state of the variable focus lens; and
   apply a further voltage across the electrode arrangement for separating the interface from the transparent end portion when the variable focus lens is enabled.

7. The electronic device as claimed in claim 6, wherein the further voltage is a predefined voltage.

8. The electronic device as claimed in claim 6, wherein the electronic device further comprises an image sensor for sensing light passing through the variable focus lens, the image sensor being arranged to provide the driver circuitry with an output signal for controlling the magnitude of the further voltage.

9. The electronic device as claimed in claim 8, wherein the image sensor is arranged to increase the further voltage until the image is free of distortion.

10. The electronic device as claimed in claim 6, wherein the electronic device further comprises an image sensor for sensing an image through the variable focus lens, the image sensor being arranged to provide the driver circuitry with an output signal for controlling the magnitude of the further voltage.

* * * * *